United States Patent
Thampy et al.

(10) Patent No.: US 7,573,952 B1
(45) Date of Patent: Aug. 11, 2009

(54) BARYCENTRIC COORDINATE TECHNIQUE FOR RESAMPLING QUANTIZED SIGNALS

(75) Inventors: Sajjit Thampy, La Jolla, CA (US); Kenny C. Gross, San Diego, CA (US); Keith Whisnant, La Jolla, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 744 days.

(21) Appl. No.: 11/210,570

(22) Filed: Aug. 23, 2005

(51) Int. Cl.
*H04L 27/00* (2006.01)
(52) U.S. Cl. .................................................. 375/316
(58) Field of Classification Search ................ 375/232, 375/240.03, 240.22, 243, 245, 316; 704/230; 382/251, 253
See application file for complete search history.

(56) References Cited

U.S. PATENT DOCUMENTS

| | | | | |
|---|---|---|---|---|
| 4,937,763 | A | 6/1990 | Mott | 364/550 |
| 5,062,152 | A * | 10/1991 | Faulkner | 398/190 |
| 6,072,496 | A * | 6/2000 | Guenter et al. | 345/419 |
| 6,668,088 | B1 * | 12/2003 | Werner et al. | 382/239 |
| 2005/0111742 | A1 * | 5/2005 | Seo | 382/233 |
| 2005/0182807 | A1 * | 8/2005 | Ramaswamy et al. | 708/420 |

OTHER PUBLICATIONS

Bath et al. Robust Memoryless Quantization for Minimum Signal Distortion, IEEE, vol. IT-28, No. 2, Mar. 1982, p. 296-306.*

* cited by examiner

*Primary Examiner*—Sam K Ahn
(74) *Attorney, Agent, or Firm*—Park, Vaughan & Fleming LLP

(57) ABSTRACT

One embodiment of the present invention provides a system that resamples a quantized signal. During operation, the system receives the quantized signal. Next, the system smoothes and resamples the quantized signal to produce a resampled signal. The system then quantizes the resampled signal to produce a quantized resampled signal. For a given time point, the system determines a probability distribution for the resampled signal across quantization levels at the given time point by using information about the values of the resampled signal at neighboring time points. Note that the probability distribution specifies the probability that the resampled signal would be sampled at specific quantization levels. The system then uses the probability distribution to probabilistically select a quantization level for the resampled signal for the given time point.

20 Claims, 4 Drawing Sheets

BARYCENTRIC COORDINATE TECHNIQUE FOR RESAMPLING QUANTIZED SIGNALS

BACKGROUND

1. Field of the Invention

The present invention relates to techniques for resampling a quantized signal. More specifically, the present invention relates to a method and apparatus for resampling and quantizing a quantized signal using Barycentric Coordinate Techniques.

2. Related Art

As computer systems become more powerful, they are increasingly being used by businesses for mission-critical applications. For example, airlines are critically dependent on computer systems that manage flight reservations, and would essentially cease to function if these systems failed. Hence, monitoring the health of computer systems is very important because it allows a system administrator to detect problems and take preventive measures before a catastrophic failure occurs.

Telemetry signals are often used to monitor the health and the performance of a computer system. Telemetry signals typically represent physical variables such as temperature, voltage, current, vibration, acoustics, etc. Note that telemetry signals may also include software-based performance parameters, such as processor load, memory/cache usage, system throughput, queue lengths, I/O traffic, quality of service, security, etc.

Once these telemetry signals are received, they are typically fed into a fault-detection application that uses statistical analysis techniques and pattern recognition techniques to determine whether the computer system is experiencing hardware degradation. These fault detection applications typically require that the telemetry signals have uniform sampling intervals that represent a consistent snapshot of the system state at a particular instant in time.

However, since telemetry signals are collected from different collector processes, they are usually not synchronized. Note that, even if the collector processes sample the telemetry signals at the same rate and are started at the same time, they may actually produce unsynchronized signals because the acquisition rate of the collector process can speed up or slow down depending on the load on the computer system.

Unsynchronized telemetry signals can be synchronized by resampling them so that all sampled variables appear to have been sampled at exactly the same point in time. Resampling is typically performed by first interpolating a signal and then sampling the interpolated signal at new points in time. For example, a linear least squares fit can be used to resample the signal. However, if the linear least squares fit is applied to a signal in real time, the resampled signal can exhibit poor correlation to the original signal due to poor fitting in regions that contain dynamic variations. To better capture dynamic trends in the data, a cubic-spline fit, which preserves the first and second time derivatives of the signal, can be used. Unfortunately, the cubic-spline fit technique can create spurious values in the resampled signal when sampling rates are high. For these reasons, the statistical distribution of the resampled signal may turn out to be different from the original signal.

Unfortunately, statistical analysis techniques used in fault detection applications can be very sensitive to changes in the statistical distribution of the quantized values. Consequently, if telemetry signals are resampled naively, it can cause the statistical distribution of the resampled signals to be different from the original signals, which in turn, can cause the fault detection application to malfunction.

Hence, what is needed is a method and an apparatus for resampling a quantized signal that preserves the statistical distribution of the quantized values of the signal.

SUMMARY

One embodiment of the present invention provides a system that resamples a quantized signal. During operation, the system receives the quantized signal. Next, the system smoothes and resamples the quantized signal to produce a resampled signal. The system then quantizes the resampled signal to produce a quantized resampled signal. For a given time point, the system determines a probability distribution for the resampled signal across quantization levels at the given time point by using information about the values of the resampled signal at neighboring time points. Note that the probability distribution specifies the probability that the resampled signal would be sampled at specific quantization levels. The system then uses the probability distribution to probabilistically select a quantization level for the resampled signal for the given time point.

In a variation on this embodiment, the quantized resampled signal preserves the statistical information content of the original quantized signal.

In a variation on this embodiment, the system determines the probability distribution for the resampled signal by first identifying two quantization levels closest to the value of the resampled signal at the given time point. The system then uses a Barycentric Coordinate Technique to compute the probability that the resampled signal would be sampled at each of the two closest quantization levels based on information about the nearest neighbors of the resampled signal for the given time point.

In a variation on this embodiment, the Barycentric Coordinate Technique produces Barycentric coordinates, wherein each Barycentric coordinate is computed as a ratio of the area of a sub-triangle (defined by a given point within a triangle and two vertices of the triangle), and the total area of the triangle. Note that the Barycentric coordinates indicate how close the given point within the triangle is to vertices of the triangle.

In a variation on this embodiment, a first point of the triangle is selected as the value of the resampled signal for a time point immediately before the given time point, a second point of the triangle is selected as the value of the resampled signal for the time point immediately after the given time point, a third point of the triangle is selected so that the triangle is a right-triangle, and the given point within the triangle is the value of the resampled signal for the given time point.

In a variation on this embodiment, while smoothing and resampling the quantized signal, the system uses an interpolation technique to smooth the quantized signal to produce a smoothed signal. The system then resamples the smoothed signal.

In a variation on this embodiment, the interpolation technique is a cubic-spline technique or a linear least-squares-fit technique.

In a variation on this embodiment, while smoothing the quantized signal, the system uses an ensemble moving average filter.

DETAILED DESCRIPTION

Figure 1:
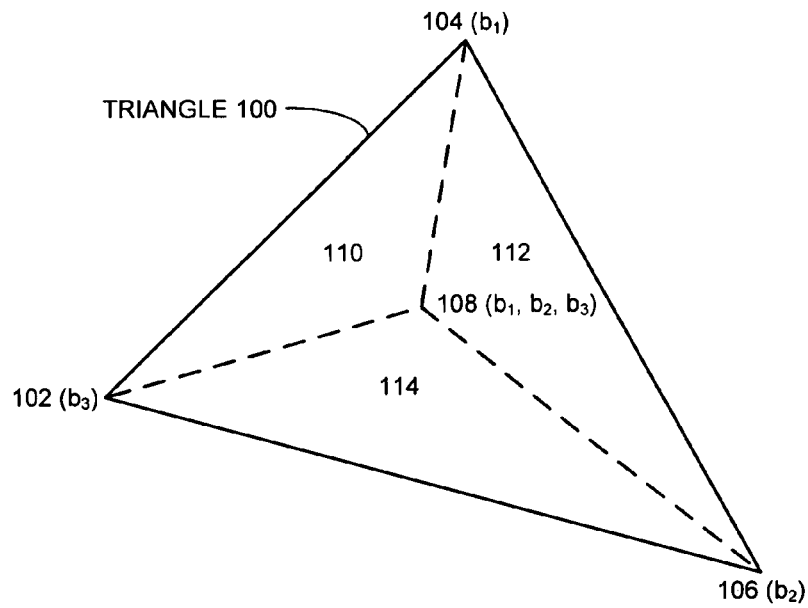
FIG. 1 illustrates how Barycentric coordinates can be determined for a point within a triangle in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Resampling

The present invention can be used to resample multiple signals so that the samples are synchronized with one another. Specifically, the present invention does this while preserving the statistical distribution of the original quantized telemetry signals.

In one embodiment, time series telemetry signals collected from the computer system are queued up into signal buffers. The buffers are then dequeued at regularly defined intervals. The dequeued values are smoothed using an ensemble moving average filter. If $\{u_j\}$ is the series that has been dequeued, the ensemble average is represented as, $$s_i = \frac{\sum_{j=i}^{i+w} u_j}{w} \tag{1}$$

where w is the length of the sampling window.

The series $\{s_i\}$ is the smoothed signal. A cubic spline/linear least squares fit can be used to reconstruct the smoothed signal. The signal is then resampled at equally-spaced resample points. At this point quantization must be restored because smoothing and interpolation techniques can produce signal values that are between the quantization bins.

Selecting a Quantized Value for the Resampled Value

Resampled values are quantized using a Barycentric Coordinate Technique (BCT), which is a computationally efficient technique that preserves the quantization distribution of the original quantized signal. The BCT can also give a better estimate of the resampled quantized value than other estimation techniques.

Barycentric coordinates are a form of general homogeneous coordinates used in numerical analysis and in computer graphics. Barycentric coordinates are a triple of numbers ($b_1$, $b_2$, $b_3$). The coordinates are applicable to points that lie within a triangle $\Delta P_1 P_2 P_3$. Barycentric coordinates satisfy the condition:

$$b_1+b_2+b_3=1 \tag{2}$$

FIG. 1 illustrates how Barycentric coordinates can be determined for point 108 within triangle 100 in accordance with an embodiment of the present invention. It illustrates vertices 102, 104, and 106, point 108, and sub-triangles 110, 112, and 114. The Barycentric Coordinates ($b_1$, $b_2$, $b_3$) of any arbitrary point, $P_r$, within the triangle (point 108) are computed by first drawing line segments $\overline{P_r P_1}$, $\overline{P_r P_2}$, and $\overline{P_r P_3}$ ($P_1$ corresponds to vertex 102, $P_2$ corresponds to vertex 104, and $P_3$ corresponds to vertex 106 in FIG. 1). The values of each Barycentric coordinate can then be computed using the following expressions:

$$b_1 = \frac{\Delta_3}{\Delta_1 + \Delta_2 + \Delta_3} \tag{3.1}$$

$$b_2 = \frac{\Delta_1}{\Delta_1 + \Delta_2 + \Delta_3} \tag{3.2}$$

$$b_3 = \frac{\Delta_2}{\Delta_1 + \Delta_2 + \Delta_3} \tag{3.3}$$

where $\Delta_1$, $\Delta_2$, and $\Delta_3$ are the areas of sub-triangles 110, 112, and 114, respectively, in FIG. 1. Note that $b_3$ is the Barycentric coordinate that corresponds to $P_1$, $b_2$ is the Barycentric Coordinate that corresponds to $P_3$, and $b_1$ is the Barycentric coordinate that corresponds to $P_2$. In a geometric sense, each Barycentric coordinate indicates how close a point within a triangle is to the corresponding vertex of the triangle.

Figure 2:
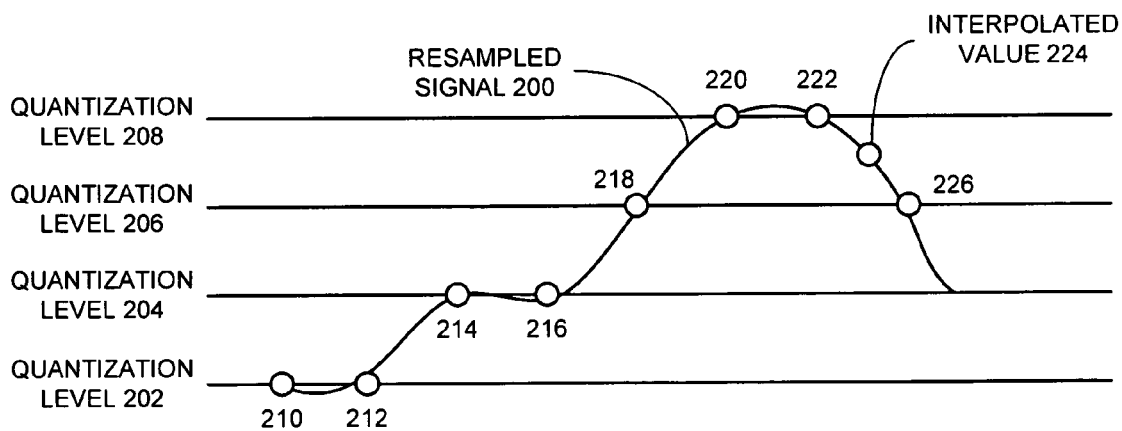
FIG. 2 illustrates a smoothed signal in accordance with an embodiment of the present invention.

FIG. 2 illustrates resampled signal 200 in accordance with an embodiment of the present invention. It illustrates quantization levels 202, 204, 206, and 208, quantized signal values 210, 212, 214, 216, 218, 220, 222, and 226, and interpolated value 224. Note that the resampled signal is generated from the quantized signal values using an interpolation technique such as a cubic-spline or linear least squares fit technique. Also note that interpolated value 224 is between quantization levels and between the original sampling time points.

One embodiment of the present invention determines which of the two quantization levels $q_k$ and $q_{k+1}$, to choose for the resampled value. Note that $q_k$ and $q_{k+1}$ are adjacent quantization levels. For example, in FIG. 2, interpolated value 224 lies between quantization levels 206 and 208. To determine which of the two quantization levels to choose, the present invention computes the probability of the resampled value being at quantization level $q_k$ or $q_{k+1}$ (i.e. quantization levels 206 and 208, respectively, in FIG. 2).

Note that an interpolated signal may or may not pass through a quantized signal value. For example, if a linear-fit interpolation technique is used, the interpolated signal may not pass through all of the quantized signal values. However, if a cubic spline fit is used, the interpolated signal passes through the quantized signal values, as shown in FIG. 2.

Figure 3:
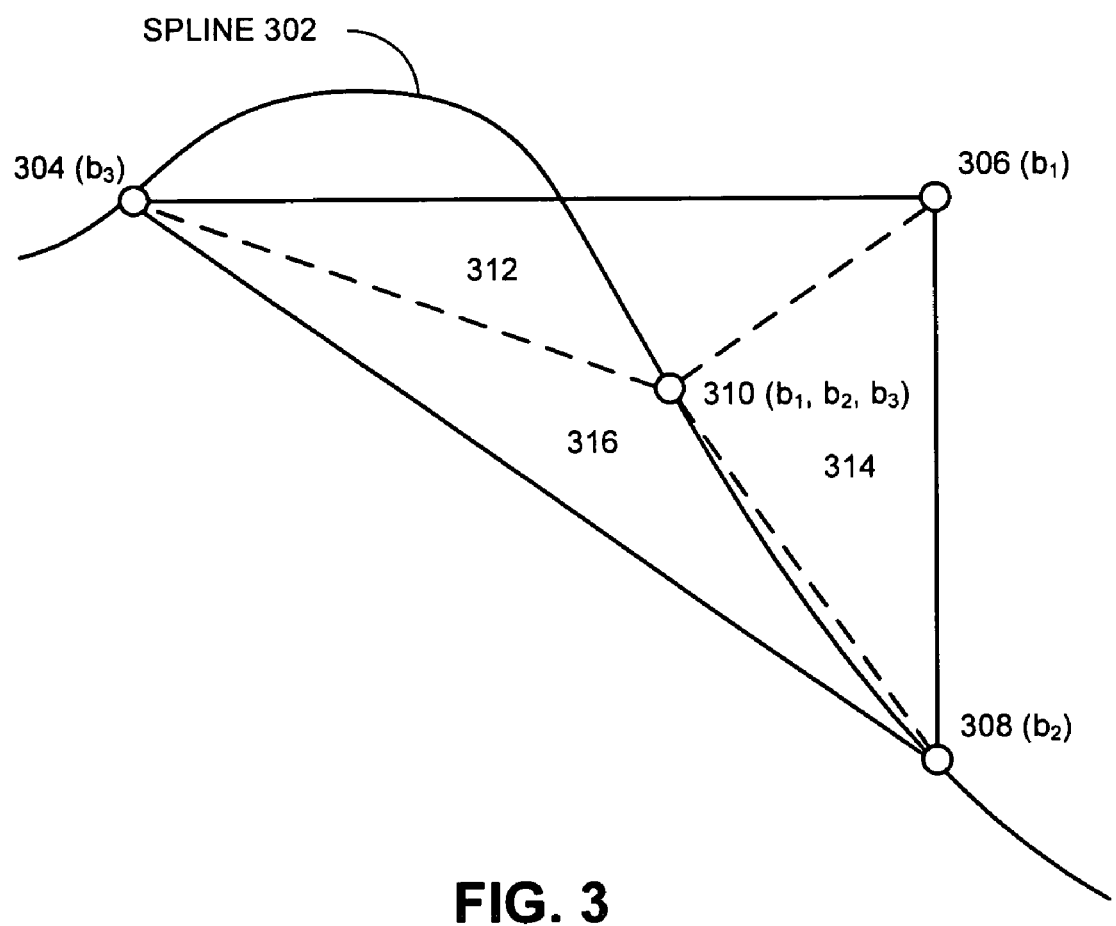
FIG. 3 illustrates how the Barycentric Coordinate Technique can be applied to a resampled signal in accordance with an embodiment of the present invention.

FIG. 3 illustrates how the Barycentric Coordinate Technique can be applied to a resampled signal in accordance with an embodiment of the present invention. It illustrates spline 302, vertices 304, 306, 308, point 310, and sub-triangles 312, 314, and 316. Point 310 is an interpolated value. Note that $P_1$ corresponds to vertex 304, $P_2$ corresponds to vertex 306, $P_3$ corresponds to vertex 308, and $P_r$ corresponds to point 310 in FIG. 3. Also note that the quantization levels for vertices 304 and 308 bracket point 310. Vertex 304 is at the quantization level immediately above point 310 and vertex 308 is at quantization level immediately below point 310. Furthermore, note that vertex 304 is at a time point immediately before the time point for point 310 and vertex 308 is at a time point immediately after the time point for point 310.

Note that $b_3$ is the Barycentric coordinate that corresponds to $P_1$, $b_2$ is the Barycentric Coordinate that corresponds to $P_3$, and $b_1$ is the Barycentric coordinate that corresponds to $P_2$.

Spline 302 may or may not pass through vertices 304 and 308 depending on the interpolation technique used. One embodiment of the present invention computes the value of point 310 ($P_r$) and then selects vertices 304 and 308 ($q_{k+1}$ and $q_k$) such that point 310 is "bracketed" by vertices 304 and 308. Similarly, the present invention selects $t_k$ and $t_{k+1}$ such that they bracket the time point for point 310. Note that in FIG. 3, vertex 304 is the point ($t_k$, $q_{k+1}$) and vertex 308 is the point ($t_{k+1}$, $q_k$). Also note that if the slope of spline 302 is positive between vertices 304 and 308 (i.e. point 310 is above vertex 304 and below vertex 308), vertex 304 is the point ($t_k$, $q_k$) and vertex 308 is the point ($t_{k+1}$, $q_{k+1}$).

Consider a point $P_2$ chosen such that $\overline{P_1P_2}$ and $\overline{P_1P_3}$ are at right angles (see FIG. 3). $P_2$ is chosen such that it makes a right angle with $P_1$ and $P_3$ because it facilitates efficient computation of the Barycentric coordinates. The Barycentric coordinates are computed using (3.1), (3.2), and (3.3). The Barycentric coordinates $b_2$ and $b_3$, are used as the probabilities that the resampled values is at the quantization level.

The probability that the resampled value takes a value $q_k$ or $q_{k+1}$ is equal to the Barycentric Coordinates $b_2$ and $b_3$, respectively:

$$P(\text{Value}=q_{k+1})=b_3 \qquad (4.1)$$

$$P(\text{Value}=q_k)=b_2 \qquad (4.2)$$

When $P_2$, is chosen such that the triangle is a right angled one, computation of the Barycentric Coordinates is computationally efficient. Note that $b_1$ does not need to be computed. If $t_r$ is the time value for which the computed resampled value is $q_r$, and $P_1[t_1,q_1]$ and $P_3[t_3, q_3]$ are the nearest values, then Barycentric Coordinates $b_2$ and $b_3$ is:

$$b_2 = \frac{(q_r - q_1)(t_r - t_1)}{(q_3 - q_1)(t_3 - t_1)} \qquad (5)$$

$$b_3 = \frac{(q_r - q_3)(t_r - t_3)}{(q_3 - q_1)(t_3 - t_1)} \qquad (6)$$

The resampled signal at a given time point is quantized by probabilistically selecting the quantization level using the probabilities $b_2$ and $b_3$.

Figure 4:
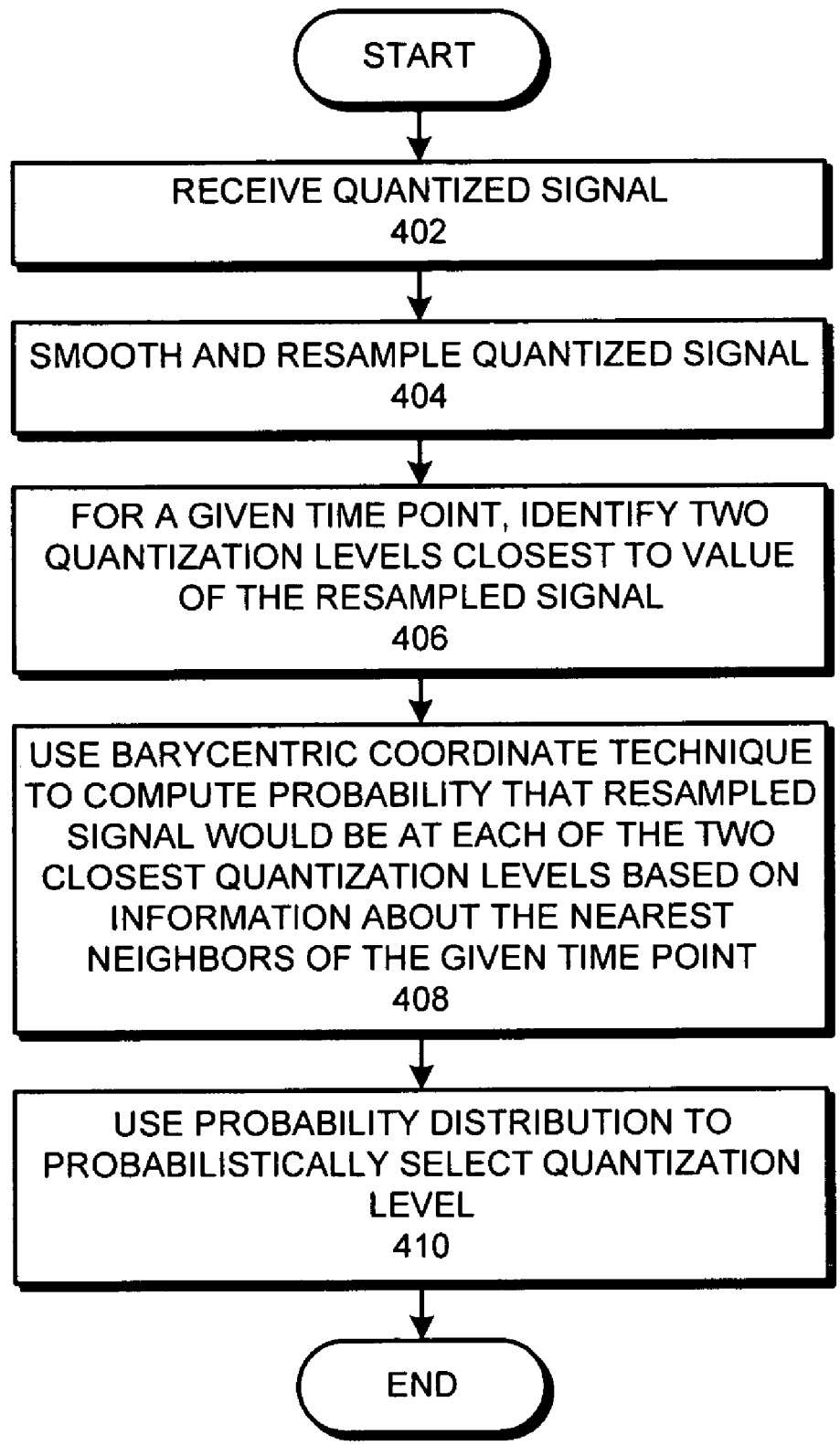
FIG. 4 presents a flow chart that illustrates a process for resampling and quantizing a quantized signal in accordance with an embodiment of the present invention.

FIG. 4 presents a flow chart that illustrates a process for resampling and quantizing a quantized signal in accordance with an embodiment of the present invention. The process begins when the system receives a quantized signal (step 402). Next, the system smoothes and resamples the quantized signal (step 404). For a given time point, the system identifies two quantization levels closest to the value of the resampled signal (step 406). Next, the system uses a Barycentric Coordinate Technique to compute the probability that the resampled signal would be at each of the two closest quantization levels based on information about the nearest neighbors of the given time point (step 408). The system then uses the probability distribution to probabilistically select the quantization level (step 410).

Figure 5:
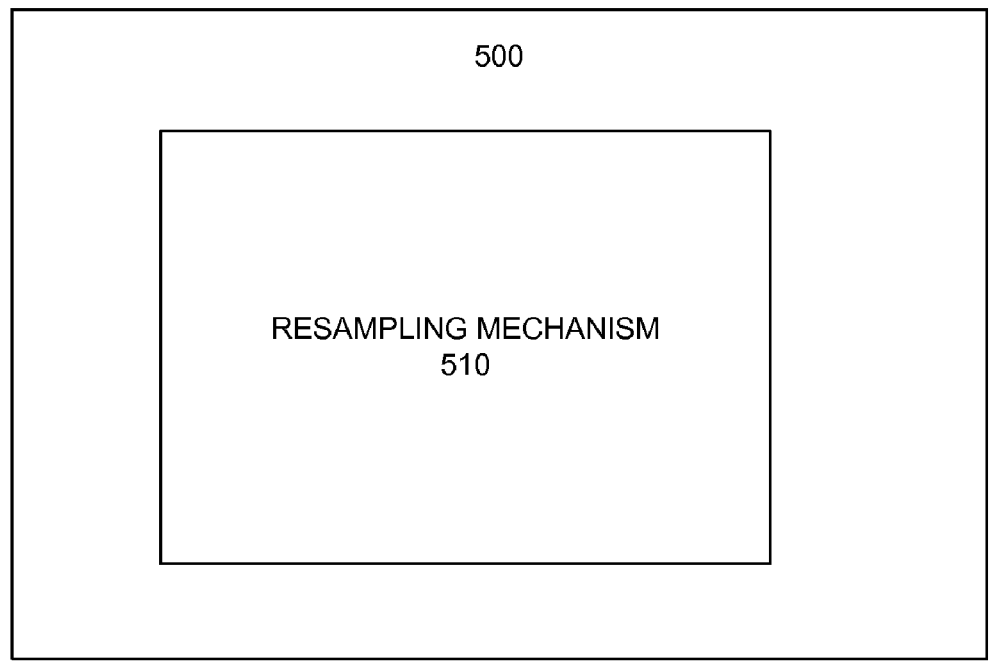
FIG. 5 presents a diagram illustrating a quantized-signal resampling and quantizing apparatus in accordance with embodiments of the present invention.

FIG. 5 presents a diagram illustrating the structure of a quantized-signal resampling and quantizing apparatus in accordance with an embodiment of the present invention. Quantized-signal resampling and quantizing apparatus 500 includes a resampling mechanism 510. Resampling mechanism 510 is configured to receive a quantized signal, smooth and resample the quantized signal to produce a resampled signal, and quantize the resampled signal to produce a quantized resampled signal. For a given time point, resampling mechanism 510 is configured to identifies two quantization levels closest to the value of the resampled signal and use a Barycentric Coordinate Technique to compute the probability that the resampled signal would be at each of the two closest quantization levels based on information about the nearest neighbors of the given time point. Resampling mechanism 510 is further configured to use the probability distribution to probabilistically select the quantization level for the resampled single for the given time point.

Figure 6:
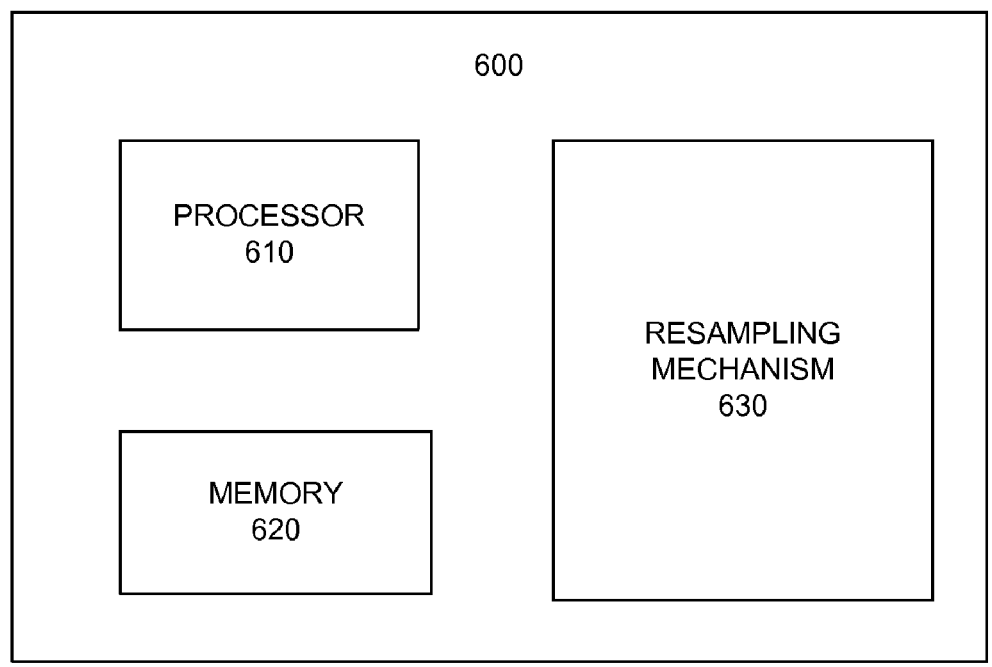
FIG. 6 presents a diagram illustrating a computer system for resampling and quantizing a quantized signal in accordance with embodiments of the present invention.

FIG. 6 presents a diagram illustrating the structure of a computer system for resampling and quantizing a quantized signal in accordance with an embodiment of the present invention. Computer system 600 includes a processor 610, a memory 620, a resampling mechanism 630, and a fault-detection application 640. Resampling mechanism 630 is configured to receive a quantized signal, smooth and resample the quantized signal to produce a resampled signal, and quantize the resampled signal to produce a quantized resampled signal. For a given time point, resampling mechanism 630 is configured to identifies two quantization levels closest to the value of the resampled signal and use a Barycentric Coordinate Technique to compute the probability that the resampled signal would be at each of the two closest quantization levels based on information about the nearest neighbors of the given time point. Resampling mechanism 630 is further configured to use the probability distribution to probabilistically select the quantization level for the resampled single for the given time point.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for resampling a quantized signal, comprising:
   receiving the quantized signal;
   smoothing and resampling the quantized signal to produce a resampled signal; and
   quantizing the resampled signal to produce a quantized resampled signal, wherein for a given time point, the quantization process involves:
   determining a probability distribution for the resampled signal across quantization levels at the given time point by using information about the values of the resampled signal at neighboring time points, wherein the probability distribution specifies the probability that the resampled signal would be sampled at specific quantization levels; and using the probability distribution to probabilistically select a quantization level for the resampled signal for the given time point; and using the resampled signal and other synchronized signals to perform a fault detection analysis on a computer system.

2. The method of claim 1, wherein the quantized resampled signal preserves the statistical information content of the original quantized signal.

3. The method of claim 1, wherein determining the probability distribution for the resampled signal across quantization levels involves:

identifying two quantization levels closest to the value of the resampled signal at the given time point; and using a Barycentric Coordinate Technique to compute the probability that the resampled signal would be sampled at each of the two closest quantization levels based on information about the nearest neighbors of the resampled signal for the given time point.

4. The method of claim 3, wherein the Barycentric Coordinate Technique produces Barycentric coordinates;

wherein each Barycentric coordinate is computed as a ratio of the area of a sub-triangle, which is defined by a given point within a triangle and two vertices of the triangle, and the total area of the triangle; and wherein the Barycentric coordinates indicate how close the given point within the triangle is to vertices of the triangle.

5. The method of claim 4, wherein a first point of the triangle is selected as the value of the resampled signal for a time point immediately before the given time point;

wherein a second point of the triangle is selected as the value of the resampled signal for the time point immediately after the given time point;

wherein a third point of the triangle is selected so that the triangle is a right-triangle; and wherein the given point within the triangle is the value of the resampled signal for the given time point.

6. The method of claim 1, wherein smoothing and resampling the quantized signal involves:

using an interpolation technique to smooth the quantized signal to produce a smoothed signal; and resampling the smoothed signal.

7. The method of claim 6, wherein the interpolation technique is a cubic-spline technique or a linear least-squares-fit technique.

8. The method of claim 6, wherein smoothing the quantized signal involves using an ensemble moving average filter.

9. An apparatus for resampling a quantized signal, comprising:

a resampling mechanism which is configured to:
receive the quantized signal;
smooth and resample the quantized signal to produce a resampled signal; and to
quantize the resampled signal to produce a quantized resampled signal, wherein for a given time point, the resampling mechanism is configured to:
determine a probability distribution for the resampled signal across quantization levels at the given time point by using information about the values of the resampled signal at neighboring time points, wherein the probability distribution specifies the probability that the resampled signal would be sampled at specific quantization levels; and to
use the probability distribution to probabilistically select a quantization level for the resampled signal for the given time point.

10. The apparatus of claim 9, wherein the quantized resampled signal preserves the statistical information content of the original quantized signal.

11. The apparatus of claim 9, wherein while determining the probability distribution for the resampled signal across quantization levels, the resampling mechanism is configured to:

identify two quantization levels closest to the value of the resampled signal at the given time point; and to use a Barycentric Coordinate Technique to compute the probability that the resampled signal would be sampled at each of the two closest quantization levels based on information about the nearest neighbors of the resampled signal for the given time point.

12. The apparatus of claim 11, wherein the Barycentric Coordinate Technique produces Barycentric coordinates;

wherein each Barycentric coordinate is computed as a ratio of the area of a sub-triangle, which is defined by a given point within a triangle and two vertices of the triangle, and the total area of the triangle; and wherein the Barycentric coordinates indicate how close the given point within the triangle is to vertices of the triangle.

13. The apparatus of claim 12, wherein a first point of the triangle is selected as the value of the resampled signal for a time point immediately before the given time point;

wherein a second point of the triangle is selected as the value of the resampled signal for the time point immediately after the given time point;

wherein a third point of the triangle is selected so that the triangle is a right-triangle; and wherein the given point within the triangle is the value of the resampled signal for the given time point.

14. The apparatus of claim 9, wherein while smoothing and resampling the quantized signal, the resampling mechanism is configured to:

using an interpolation technique to smooth the quantized signal to produce a smoothed signal; and to resampling the smoothed signal.

15. The apparatus of claim 14, wherein the interpolation technique is a cubic-spline technique or a linear least-squares-fit technique.

16. The apparatus of claim 14, wherein while smoothing the quantized signal, the resampling mechanism is configured to use an ensemble moving average filter.

17. A computer system for resampling a quantized signal, comprising:

a resampling mechanism which is configured to:
receive the quantized signal;
smooth and resample the quantized signal to produce a resampled signal; and to
quantize the resampled signal to produce a quantized resampled signal, wherein for a given time point, the resampling mechanism is configured to:
determine a probability distribution for the resampled signal across quantization levels at the given time point by using information about the values of the resampled signal at neighboring time points, wherein the probability distribution specifies the probability that the resampled signal would be sampled at specific quantization levels; and to use the probability distribution to probabilistically select a quantization level for the resampled signal for the given time point.

18. The computer system of claim 17, wherein the quantized resampled signal preserves the statistical information content of the original quantized signal.

19. The computer system of claim 17, wherein while determining the probability distribution for the resampled signal across quantization levels, the resampling mechanism is configured to:

identify two quantization levels closest to the value of the resampled signal at the given time point; and to use a Barycentric Coordinate Technique to compute the probability that the resampled signal would be sampled at each of the two closest quantization levels based on information about the nearest neighbors of the resampled signal for the given time point.

20. The computer system of claim 19, wherein the Barycentric Coordinate Technique produces Barycentric coordinates;

wherein each Barycentric coordinate is computed as a ratio of the area of a sub-triangle, which is defined by a given point within a triangle and two vertices of the triangle, and the total area of the triangle; and wherein the Barycentric coordinates indicate how close the given point within the triangle is to vertices of the triangle.

* * * * *